(12) United States Patent
Kim et al.

(10) Patent No.: US 9,105,432 B2
(45) Date of Patent: Aug. 11, 2015

(54) APPARATUS AND METHOD FOR GENERATING DIGITAL VALUE

(75) Inventors: Tae Wook Kim, Seoul (KR); Dong Kyue Kim, Seoul (KR); Byong Deok Choi, Seoul (KR)

(73) Assignee: ICTK CO., LTD, Seoul (KR)

( * ) Notice: Subject to any disclaimer, the term of this patent is extended or adjusted under 35 U.S.C. 154(b) by 191 days.

(21) Appl. No.: 13/806,681

(22) PCT Filed: Mar. 30, 2012

(86) PCT No.: PCT/KR2012/002417
§ 371 (c)(1),
(2), (4) Date: Dec. 21, 2012

(87) PCT Pub. No.: WO2012/134239
PCT Pub. Date: Oct. 4, 2012

(65) Prior Publication Data
US 2013/0093502 A1    Apr. 18, 2013

(30) Foreign Application Priority Data

Mar. 31, 2011  (KR) .................. 10-2011-0029431
Mar. 30, 2012  (KR) .................. 10-2012-0033362

(51) Int. Cl.
*H01H 85/02*       (2006.01)
*H03K 19/177*     (2006.01)
(Continued)

(52) U.S. Cl.
CPC ........... *H01H 85/0241* (2013.01); *G06F 7/588* (2013.01); *G09C 1/00* (2013.01); *H03K 19/17768* (2013.01); *H04L 9/0866* (2013.01); *H04L 9/3278* (2013.01)

(58) Field of Classification Search
CPC .. G11C 17/16; G11C 29/027; G11C 14/0081; G11C 14/009; G11C 16/22; H01L 23/5256; H01L 27/112; H01L 27/11206; H03K 3/0375; H03K 19/17768; H04L 9/3278; G06F 21/76; G06F 21/75; G01R 31/31719
USPC .......... 326/8; 327/202–208; 365/158, 185.03, 365/185.05, 185.18, 185.24, 185.28
See application file for complete search history.

(56) References Cited

U.S. PATENT DOCUMENTS 5,581,505 A * 12/1996 Lee .......................... 365/189.11
6,161,213 A    12/2000 Lofstrom
(Continued)

FOREIGN PATENT DOCUMENTS

CA    2 482 635 A1    10/2003
JP    2004-511082     4/2004
(Continued)

OTHER PUBLICATIONS

International Search Report, mailed Oct. 17, 2012, in International Application No. PCT/KR2012/002417.
(Continued)

*Primary Examiner* — Vibol Tan
(74) *Attorney, Agent, or Firm* — Finnegan, Henderson, Farabow, Garrett & Dunner, LLP

(57) ABSTRACT

Provided is an apparatus for generating a digital value that may generate a random digital value, and guarantee time invariance of the generated digital value. The apparatus may include a digital value generator to generate a random digital value using semiconductor process variation, and a digital value freezing unit that may be connected to the digital value generator and fixed to one of a first state and a second state based on the generated digital value, to freeze the digital value.

68 Claims, 15 Drawing Sheets

(51) Int. Cl.
*G09C 1/00* (2006.01)
*H04L 9/08* (2006.01)
*G06F 7/58* (2006.01)
*H04L 9/32* (2006.01)

(56) References Cited

U.S. PATENT DOCUMENTS

| | | | |
|---|---|---|---|
| 6,246,623 B1 * | 6/2001 | Ingalls | 365/225.7 |
| 6,434,077 B1 * | 8/2002 | Holmes | 365/225.7 |
| 6,549,050 B1 * | 4/2003 | Meyers et al. | 327/217 |
| 6,777,992 B2 * | 8/2004 | Ziesler et al. | 327/208 |
| 6,906,557 B1 * | 6/2005 | Parker et al. | 327/53 |
| 6,941,536 B2 | 9/2005 | Muranaka | |
| 7,230,473 B2 | 6/2007 | Tadeparthy et al. | |
| 7,495,310 B2 * | 2/2009 | Douzaka et al. | 257/529 |
| 7,495,472 B2 * | 2/2009 | Yu et al. | 326/38 |
| 7,911,870 B2 * | 3/2011 | Kobatake | 365/225.7 |
| 7,986,024 B2 * | 7/2011 | Nirschl | 257/529 |
| 8,203,861 B2 * | 6/2012 | Liu | 365/94 |
| 8,749,265 B2 * | 6/2014 | Kim et al. | 326/8 |
| 2004/0053429 A1 | 3/2004 | Muranaka | |
| 2006/0208790 A1 | 9/2006 | Tadeparthy et al. | |
| 2008/0279373 A1 | 11/2008 | Erhart et al. | |
| 2009/0114972 A1 * | 5/2009 | Liu | 257/315 |
| 2010/0070777 A1 | 3/2010 | Salters et al. | |
| 2012/0037711 A1 | 2/2012 | Kim et al. | |

FOREIGN PATENT DOCUMENTS

| | | |
|---|---|---|
| JP | 2006-173485 | 6/2006 |
| KR | 10-2010-0117006 A | 11/2010 |
| WO | WO 01/73841 A2 | 10/2001 |
| WO | WO 2008/056612 A1 | 5/2008 |
| WO | WO 2010/123185 A1 * | 10/2010 |

OTHER PUBLICATIONS

G. E. Suh et al., "AEGIS: A Single-chip secure processor," ELSEVIER, Information Security Technical Report, 2005, pp. 63-73 (11 pages).

P Tuyls, "To store or not to store a key that is the question!," Philips Corporate Technologies, Business Unit Intrinsic-ID, May 28, 2008 (16 pages).

Extended European search report dated Sep. 19, 2014, in European Application No. 12785882.3.

* cited by examiner

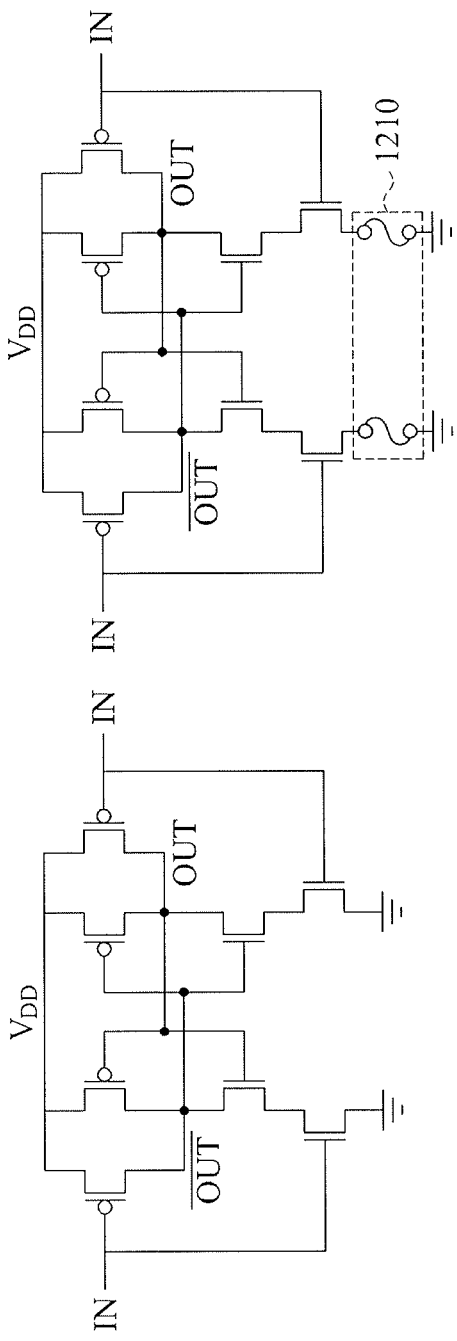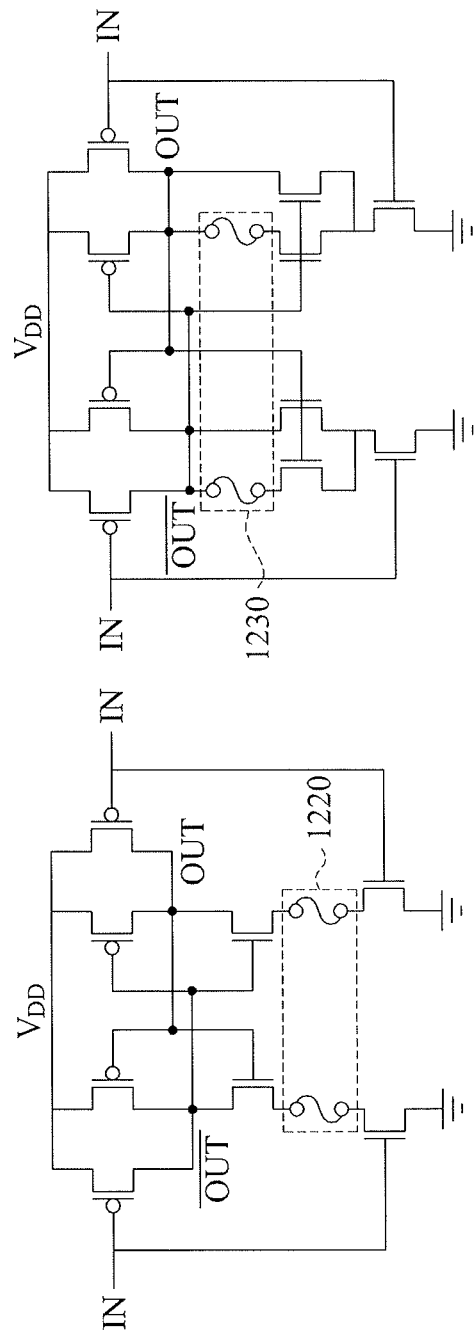
FIG. 12B
FIG. 12D
FIG. 12A
FIG. 12C

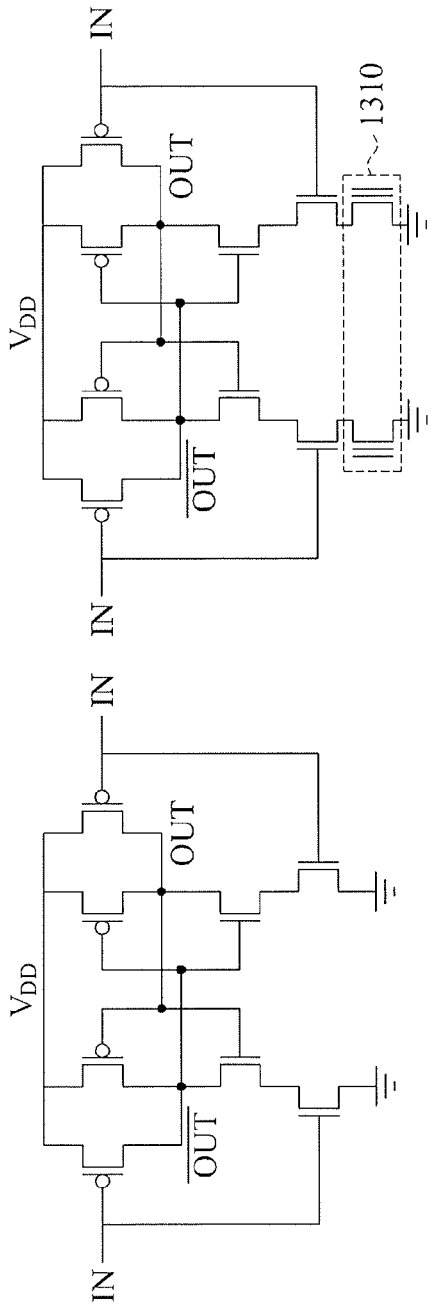
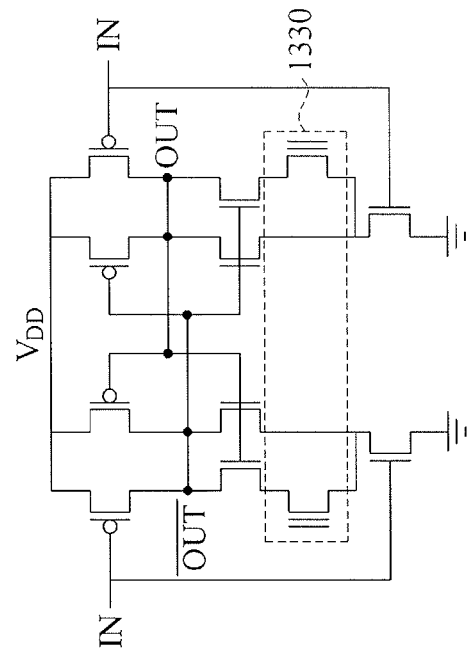
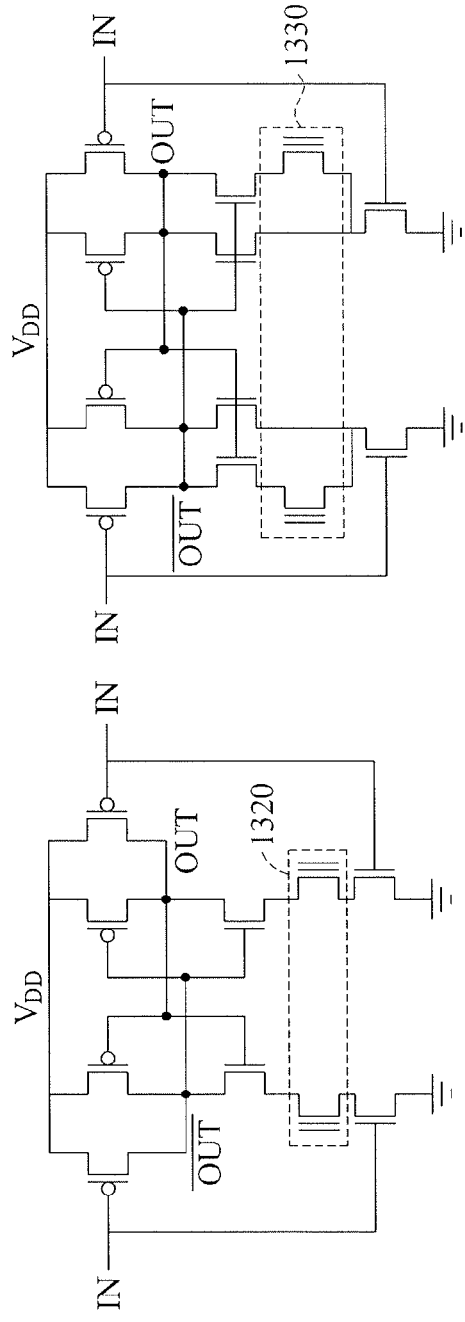
FIG. 13A
FIG. 13B
FIG. 13C
FIG. 13D

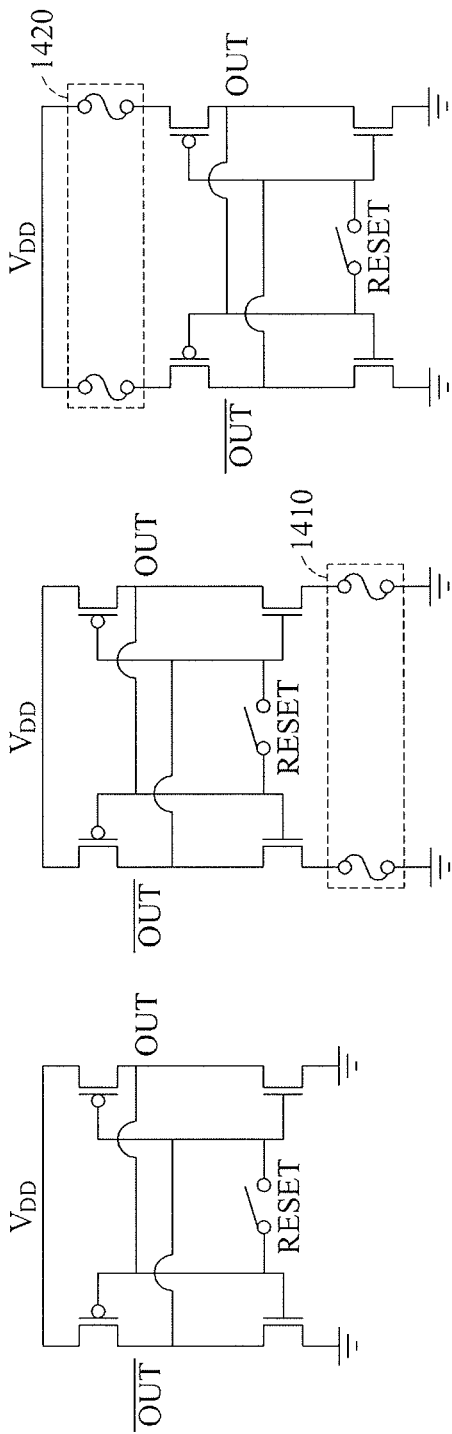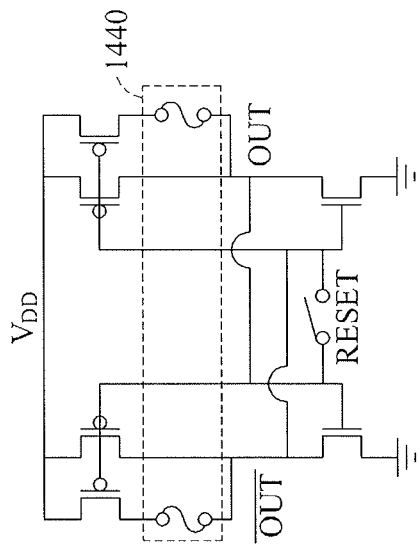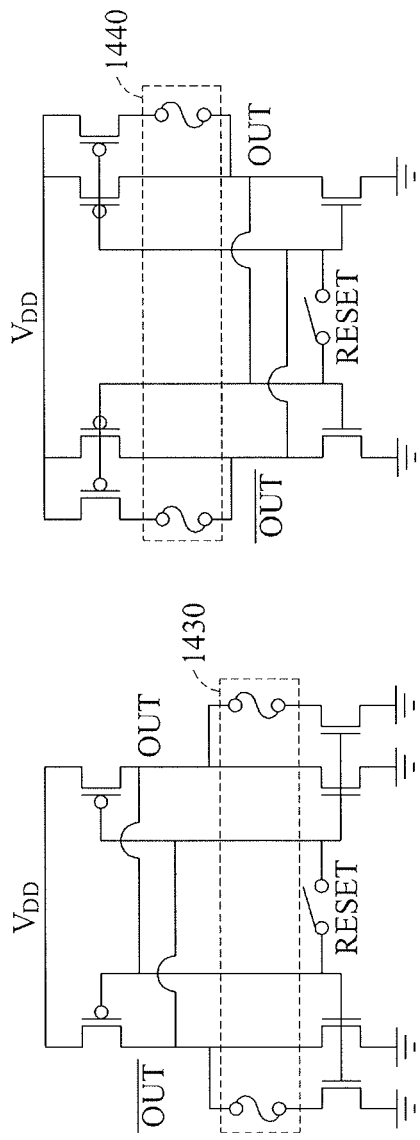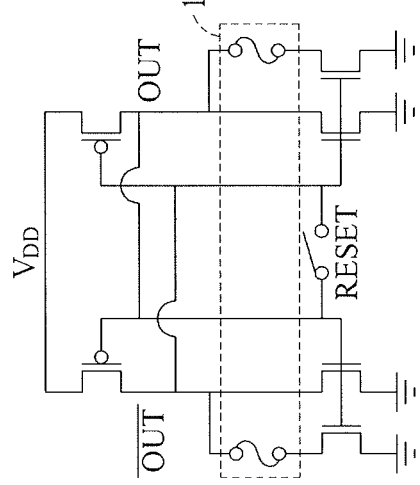
FIG. 14A  FIG. 14B  FIG. 14C  FIG. 14D  FIG. 14E

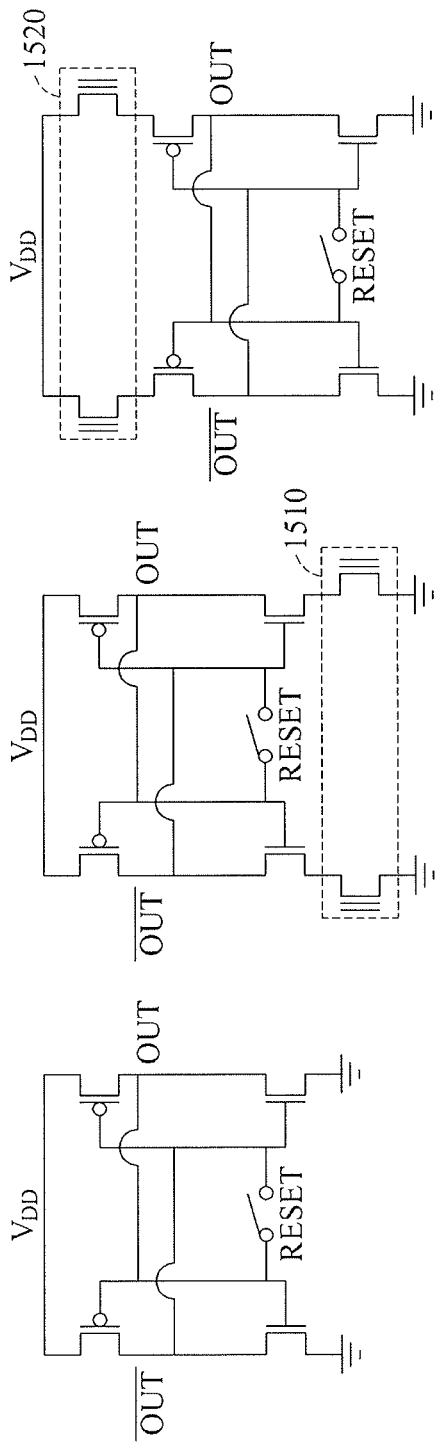
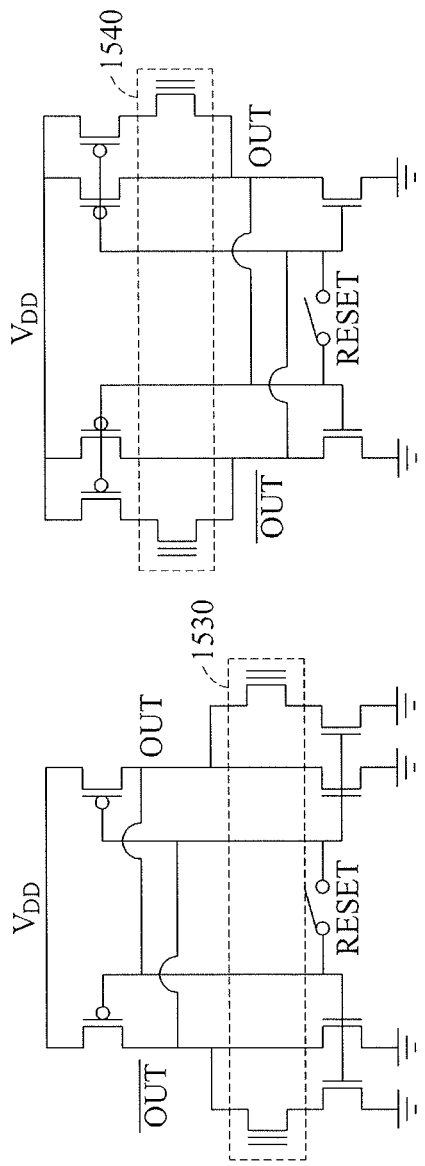
FIG. 15A  FIG. 15B  FIG. 15C  FIG. 15D  FIG. 15E

APPARATUS AND METHOD FOR GENERATING DIGITAL VALUE

CROSS REFERENCE TO RELATED APPLICATIONS

This application is a national phase application based on PCT/KR2012/002417, filed on Mar. 30, 2012, and claims the benefit of priority to Korean Patent Application No. 10-2011-0029431, filed on Mar. 31, 2011, and Korean Patent Application No. 10-2012-0033362, filed on Mar. 30, 2012, all of which are incorporated herein by reference in their entirety.

BACKGROUND

1. Field of the Invention

Exemplary embodiments relate to a digital security field, and more particularly, to an apparatus and a method for generating an identification (ID) key used for an encoding and decoding method, a digital signature, and the like that may be necessary for security of an electronic apparatus, embedded system security, system on chip (SoC) security, smart card security, universal subscriber identity module (USIM) security, and the like.

2. Description of the Related Art

Recent developments in technology such as an electronic tag, and the like, have increased the need for inserting a unique identification (ID), which will be hereinafter referred to as an ID key, to a mass-produced chip. Accordingly, there is a desire to develop an apparatus and method for generating a random digital value, for example, an ID key, a unique ID, and the like.

However, in order to use the ID key as a unique ID of an apparatus or a chip, a high level of randomness and time invariance may be required. In this instance, the randomness may indicate that probabilities of digital bits that form a generated ID key corresponding to digital values of '1' and '0' may be random, and the time invariance may indicate that the generated ID key may be invariant over time.

However, there exists an issue in that an apparatus for generating a digital value may generate a digital value that may satisfy the desired randomness, yet fail to satisfy the desired level of reliability, that is, the time invariance due to a noise, differential aging, and the like.

Accordingly, there is a desire for an apparatus and method for generating an unclonable digital value that may be impervious to noise and environmental changes such as a change in an external temperature, and the like, and may be guaranteed to be time invariant.

SUMMARY

In one general aspect there is provided an apparatus and method that may generate a random digital value having a simple configuration, and may freeze the generated value so that it may be guaranteed to be time invariant, by configuring a Physically Unclonable Function (PUF) through process variation of a manufacturing process of a semiconductor chip.

In another general aspect there is provided an apparatus and method for generating a digital value, which may generate a reliable random digital value and freeze the generated value so that it may be resistant to noise and environmental changes, and may be guaranteed to be time invariant.

According to an aspect, there is provided an apparatus for generating a digital value, the apparatus including a digital value generator to generate a random digital value using semiconductor process variation, and a digital value freezing unit that may be connected to the digital value generator, and set to one of a first state and a second state based on the generated digital value, to freeze the digital value.

Here, the digital value generator may include a PUF.

In certain embodiments, the PUF may include a first inverter and a second inverter that may be manufactured by an equivalent process, and may have different electrical characteristic values using process variation in the manufacturing process. An output terminal of the first inverter and an input terminal of the second inverter may be connected to a first node, and an input terminal of the first inverter and an output terminal of the second inverter may be connected to a second node that may differ from the first node. When the first node and the second node are shorted and subsequently opened, the digital value generator may generate the digital value based on a logical level of at least one of the first node and the second node that are determined based on a difference in a logic threshold value between the inverters.

In certain embodiments, the PUF may include a differential amplifier, and the digital value generator may generate the digital value by comparing voltage values of two output nodes when two input nodes of the differential amplifier are shorted.

In certain embodiments, the PUF may include a Set-Reset (SR) latch, and the digital value generator may generate the digital value based on a logical level of at least one of two output nodes that may be determined based on a difference in a logic threshold value of a logic gate constituting the SR latch when a logical level of '1' is input to two input nodes of the SR latch and a logical level of '0' is input to the two input nodes of the SR latch.

In certain embodiments, the PUF may include a SR latch, and the digital value generator may generate the digital value based on a logical level of at least one of two output nodes that may be determined based on a difference in a logic threshold value of a logic gate constituting the SR latch when two output nodes of the SR latch are shorted, and then opened while a logical level of '0' is input to two input nodes of the SR latch.

In certain embodiments, the digital value freezing unit may include at least one fuse that may be blown or un-blown to freeze the digital value, by receiving an overcurrent corresponding to the digital value generated during a first operation of the digital value generator.

In this instance, the first state may correspond to a state in which the at least one fuse may be blown, and the second state may correspond to a state in which the at least one fuse may be un-blown.

In certain embodiments, the digital value freezing unit may include at least one One Time Programmable (OTP) device that may be programmed based on the digital value generated during a first operation of the digital value generator to freeze the digital value.

According to another aspect there is also provided an apparatus for generating a digital value, the apparatus including a digital value generator to generate a random digital value using semiconductor process variation, and, a digital value storage unit, connected to the digital value generator, to store the generated digital value.

Here, the digital value generator may include a PUF.

In certain embodiments, the PUF may include a first inverter and a second inverter that may be manufactured by an equivalent process, and may have different electrical characteristic values using process variation in the manufacturing process. An output terminal of the first inverter and an input terminal of the second inverter may be connected to a first node, and an input terminal of the first inverter and an output terminal of the second inverter may be connected to a second node that may differ from the first node. When the first node and the second node are shorted and then opened, the digital value generator may generate the digital value based on a logical level of at least one of the first node and the second node.

In certain embodiments, the PUF may include a differential amplifier, and the digital value generator may generate the digital value by comparing voltage values of two output nodes when two input nodes of the differential amplifier are shorted.

In certain embodiments, the PUF may include an SR latch, and the digital value generator may generate the digital value based on a logical level of at least one of two output nodes that may be determined based on a difference in a logic threshold value of a logic gate constituting the SR latch when a logical level of '1' is input to two input nodes of the SR latch, and then a logical level of '0' is input to the two input nodes of the SR latch.

In certain embodiments, the PUF may include an SR latch, and the digital value generator may generate the digital value based on a logical level of at least one of two output nodes that may be determined based on a difference in a logic threshold value of a logic gate constituting the SR latch when two output nodes of the SR latch are shorted, and then opened while a logical level of '0' is input to two input nodes of the SR latch.

The digital value storage unit may include at least one non-volatile memory device that may store the digital value generated during a first operation of the digital value generator.

In this instance, the at least one non-volatile memory device may correspond to a multi-time programmable or many-time programmable (MTP) device.

The at least one non-volatile memory device may correspond to at least one of an Electrically Erasable and Programmable Read-Only Memory (EEPROM), a flash memory, a Silicon-Oxide-Nitride-Oxide-Silicon (SONOS) memory, a Ferroelectrics Random Access Memory (FRAM), and a Resistive Random Access Memory (RRAM).

According to another aspect there is provided a method of generating a digital value, the method including generating, by a digital value generator of an apparatus for generating a digital value, a random digital value using process variation of at least one device included in the digital value generator, and freezing, by a digital value freezing unit being connected to the digital value generator, the generated digital value when the digital value freezing unit is fixed to one of a first state and a second state based on the generated digital value.

In this instance, the freezing of the digital value may include applying an overcurrent to at least one fuse included in the digital value freezing unit, based on the digital value generated during a first operation of the digital value generator, and freezing the digital value depending on whether the at least one fuse is blown by the overcurrent.

The freezing of the digital value may include programming at least one OTP device included in the digital value freezing unit, based on the digital value generated at a first operation of the digital value generator, and freezing the digital value depending on whether the at least one OTP device is programmed.

According to another aspect there is provided a method of generating a digital value, the method including generating, by a digital value generator of an apparatus for generating a digital value, a random digital value using process variation of at least one device included in the digital value generator, and storing, by a digital value storage unit being connected to the digital value generator, the generated digital value.

In this instance, the storing of the digital value may include programming at least one non-volatile memory device included in the digital value generator, based on the generated digital value.

The at least one non-volatile memory device may correspond to an MTP device.

The at least one non-volatile memory device may correspond to at least one of an EEPROM, a flash memory, a SONOS memory, a FRAM, and a RRAM.

Effect of the Invention

According to exemplary embodiments, a configuration of a circuit that may generate a digital value using process variation in manufacturing of a semiconductor chip may be simple and time invariance may be satisfied, whereby reliability of the digital value may be increased.

According to exemplary embodiments, although another semiconductor chip may be manufactured under the same design, an identical identification (ID) key may not be generated and a semiconductor chip may be unclonable and thus, high security may be guaranteed.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

FIGS. 12A through 12D are diagrams in which a digital value freezing unit is disposed in an apparatus for generating a digital value according to various exemplary embodiments;

FIGS. 13A through 13D are diagrams illustrating various configurations of a digital value freezing unit when the digital value freezing unit is configured using a One Time Programmable (OTP) device according to an exemplary embodiment;

FIGS. 14A through 14E are diagrams in which a digital value freezing unit is disposed in an apparatus for generating a digital value when a digital value generator is configured according to the embodiment of FIG. 5, according to an exemplary embodiment;

FIGS. 15A through 15E are diagrams illustrating various configurations of a digital value freezing unit when a digital value generator is configured according to the embodiment of FIG. 5 and the digital value freezing unit is configured using an OTP device, according to an exemplary embodiment;

DETAILED DESCRIPTION

Figure 1:
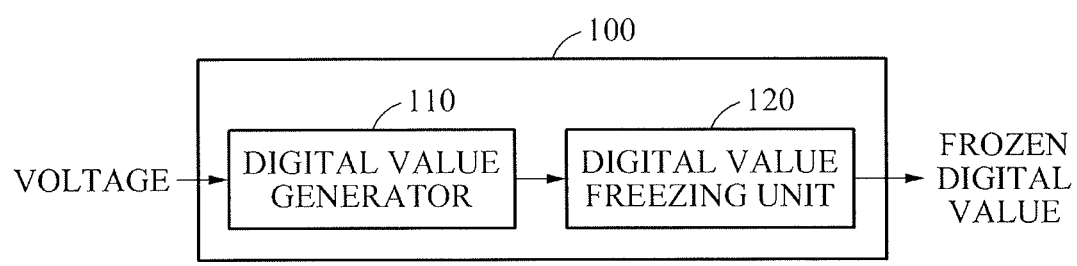
FIG. 1 is a block diagram illustrating an apparatus for generating a digital value according to an exemplary embodiment.

Reference will now be made in detail to exemplary embodiments of the present disclosure, examples of which are illustrated in the accompanying drawings, wherein like reference numerals refer to the like elements throughout. Exemplary embodiments are described below to explain the present disclosure by referring to the figures.

FIG. 1 is a block diagram illustrating an apparatus 100 for generating a digital value according to an exemplary embodiment.

The apparatus 100 may include a digital value generator 110, and a digital value freezing unit 120.

The digital value generator 110 may generate a random digital value in response to a signal that may be applied to the digital value generator 110. The random digital value may be generated using semiconductor process variation that may occur in a process of manufacturing at least one semiconductor device constituting the digital value generator 110. The foregoing will be described in more detail.

The semiconductor process variation may occur for various reasons. For example, when a transistor is to be manufactured, process variation may be caused by design parameters, for example, an efficient gate length, a coefficient associated with a doping concentration, an index associated with an oxide thickness, a threshold voltage, and the like. The semiconductor process variation may result from a natural phenomenon and may be reduced.

Generally, a process of manufacturing a semiconductor having infinitesimal process variation may be regarded as being excellent. Accordingly, various attempts to reduce the process variation have been made in a technological field of a semiconductor process.

However, the digital value generator 110 may generate a random digital value using the semiconductor process variation. For example, the random digital value may correspond to one of a value of '1' and '0.'

When the digital value generator 110 generates a random digital value using the semiconductor process variation, a problem relating to time invariance may arise due to an environmental change, for example, noise, differential aging, external (e.g., ambient) temperatures, and the like. The time invariance may be related to reliability based on whether the generated digital value may be utilized in security and authentication fields and thus, there is a demand for a solution to the aforementioned problem.

Accordingly, in certain embodiments, the digital value freezing unit 120 may guarantee time invariance for the digital value generated by the digital value generator 110, so that the digital value is resistant to environmental change, for example, noise, external temperatures, and the like.

In certain embodiments, the digital value freezing unit 120 may be connected to the digital value generator 110, and may be set to one of a first state and a second state based on the digital value generated by the digital value generator 110 to freeze the digital value.

Each of the first state and the second state may correspond to values used to read the generated digital value, for example, values corresponding to '1' or '0.'

Hereinafter, various embodiments will be described with reference to FIGS. 2 through 19. Exemplary embodiments of the digital value freezing unit 120 will be described with reference to FIGS. 2 and 3, and exemplary embodiments of the digital value generator 110 will be described with reference to FIGS. 5 through 9.

Furthermore, exemplary embodiments including the digital value generator 110 and the digital value freezing unit 120 will be described with reference to FIGS. 10 through 17D.

According to certain embodiments, a digital value storage unit storing and providing the generated digital value may be included, in lieu of the digital value freezing unit 120, for guaranteeing time invariance. The digital value storage unit will be described with reference to FIG. 4.

Figure 2:
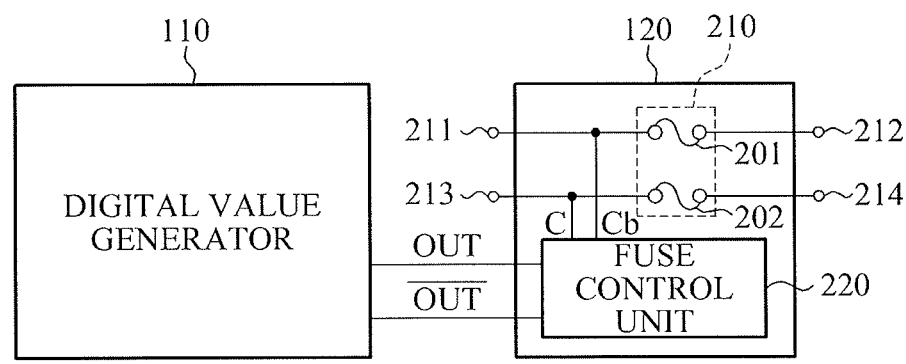
FIG. 2 is a diagram illustrating a configuration of a digital value freezing unit according to an exemplary embodiment.

FIG. 2 is a diagram illustrating a configuration of the digital value freezing unit 120 of FIG. 1 according to an exemplary embodiment.

In certain embodiments, the digital value freezing unit 120 of apparatus 100 in FIG. 1 may include a fuse unit 210 including a fuse 201 and a fuse 202, and a fuse control unit 220 to change physical connection states of the fuse 201 and the fuse 202, based on a generated digital value.

When the digital value generator 110 of FIG. 1 provides, through a terminal OUT and a terminal OUT_BAR, complementary digital values, for example, a value of '1' and a value of '0,' the fuse control unit 220 of the digital value freezing unit 120 may transfer a control signal C and a control signal Cb to the fuse 201 and the fuse 202 included in the fuse unit 210, respectively. When an overcurrent is applied to one of the fuse 201 and the fuse 202, based on the control signal C and the control signal Cb, one of the fuse 201 and the fuse 202 may be blown.

For example, when a value of the terminal OUT corresponds to '1,' the fuse control unit 220 may blow the fuse 201. In this instance, in addition to the case of blowing a fuse corresponding to a digital value of '1,' a reverse case of blowing a fuse corresponding to a digital value of '0' may also be possible. Hereinafter, although embodiments are described with respect to the digital value of '1' or '0,' other embodiments may also be possible.

In order for a fuse to be blown, at least one terminal among terminals 211, 212, 213, and 214 of the fuse 201 and the fuse 202 may be connected to a voltage $V_{DD}$ or a ground. Also, depending on embodiments, the terminals 211, 212, 213, and 214 may be connected to a plurality of nodes included in the digital value generator 110, respectively. The foregoing embodiments will be described in detail with reference to FIGS. 12A through 12D, 14A through 14E, and 16A through 16D.

The digital value freezing unit 120 may change a physical state, based on the digital value generated by the digital value generator 110, and may be fixed to an irreversible state. Accordingly, time invariance for the random digital value generated by the digital value generator 110 may be guaranteed.

When the digital value is to be read in the future, the digital value may be read by identifying a blown fuse or an un-blown fuse from the fuse 201 and the fuse 202 included in the fuse unit 210 of the digital value freezing unit 120.

According to another exemplary embodiment, a connection state of a circuit in an apparatus for generating a digital value may be set based on a result of identifying a blown fuse or an un-blown fuse from the fuse 201 and the fuse 202, whereby an output value of the digital value generator 110 may be frozen, and the output value may be read as the digital value.

For ease of reference, according to an embodiment, the digital value generator 110 may include N unit cells that may generate a single digital value or a pair of complementary digital values, to generate an N-bit digital value. Here, N may correspond to a natural number.

In this instance, the digital value freezing unit 120 may include N fuse units, to freeze the N-bit digital value. Here, when both the fuse 201 and the fuse 202 of the fuse unit 210 corresponding to a predetermined unit cell are blown, or conversely, when both the fuse 201 and the fuse 202 are un-blown, a value of the corresponding unit cell may be considered as "invalid."

Herein, although it may be described, for ease of description, that the digital value generator 110 may generate a single digital value or a pair of digital values, the present invention is not limited to the foregoing embodiment.

Accordingly, unless otherwise mentioned, N unit cells may be included in the digital value generator 110, and N digital values may be generated and frozen or stored, according to scalability of a circuit.

In addition, with reference to the configuration of the fuse unit 210 of FIG. 2, although it may be described that the digital value may be frozen by changing a physical state based on the digital value generated by the digital value generator 110, the foregoing may be provided as only an exemplary embodiment. Any other modified embodiments to provide time invariance for the digital value generated by changing a physical structure based on the generated digital value may be included.

In certain embodiments, the digital value freezing unit 120 may be configured using a One Time Programmable (OTP) device. Although the fuse unit 210 which may store the generated digital value once by a change of the physical state may be regarded as an OTP device, a one-time programmable device, other than a configuration of the fuse unit 210, will be hereinafter referred to as an OTP device, as an example of a non-volatile memory. The foregoing embodiment will be described in detail with reference to FIG. 3.

Figure 3:
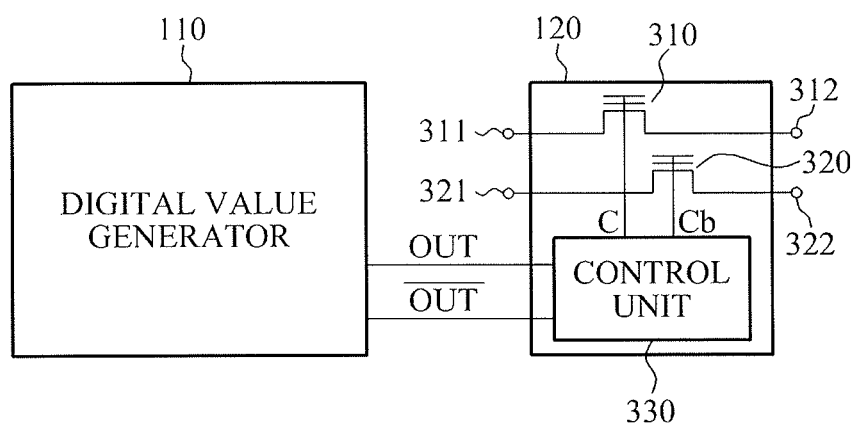
FIG. 3 is a diagram illustrating a configuration of a digital value freezing unit according to another exemplary embodiment.

FIG. 3 is a diagram illustrating a configuration of the digital value freezing unit according to another exemplary embodiment.

When a pair of digital values generated by the digital value generator 110 is transferred to a control unit 330 through a terminal OUT and a terminal OUT_BAR, gates of OTP devices included in the digital value freezing unit 120 may be controlled based on a control signal C and a control signal Cb of the control unit 330, whereby the digital value may be programmed in non-volatile OTP devices 310 and 320. In this instance, once the digital value is programmed, the digital value may be invariant.

Accordingly, similar to the descriptions relating to the fuse unit 210 of FIG. 2, time invariance for a random digital value generated by the digital value generator 110 may be guaranteed.

For example, when a digital value of '1' is transferred to the control unit 330 through the OUT terminal, and a digital value of '0' is transferred to the control unit 330 through the OUT_BAR terminal, the digital value of '1' may be programmed in the OTP device 310, and the digital value of '0' may be programmed in the OTP device 320, based on the control signal C and the control signal Cb of the control unit 330. In certain embodiments, it may not be possible to rewrite the programmed values.

Terminals of both ends of the OTP devices 310 and 320 may be connected to a plurality of nodes in the apparatus 100 consistent with disclosed embodiments, and various examples of such connections will be described later with reference to FIGS. 13A through 13D, 15A through 15E, and 17A through 17D.

Various embodiments may describe a method of configuring the OTP devices 310 and 320, to a programmable read-only memory (PROM) or a field programmable read-only memory (FPROM). In the embodiments of FIGS. 1 through 3, in a process of applying a voltage or a current to the apparatus 100, a digital value or a pair of digital values may be generated using process variation of a semiconductor device(s) in the digital value generator 110, and the digital value or the pair of digital values may be frozen immediately in the fuse unit 210 or the OTP devices 310 and 320.

However, consistent with disclosed embodiments, the freezing process may be substituted with a process of storing the generated digital value in a non-volatile memory. Such embodiments will be described with reference to FIG. 4.

Figure 4:
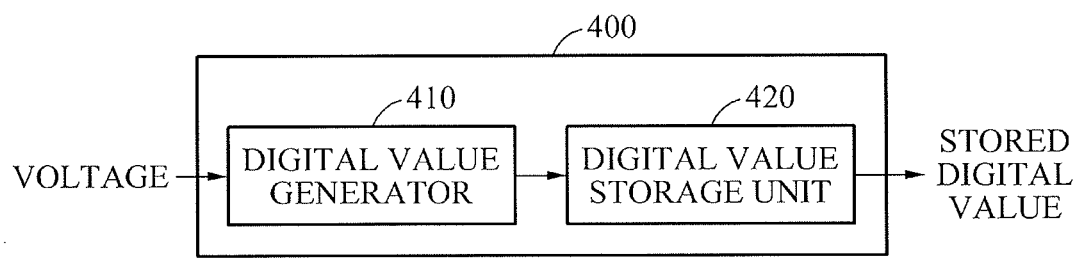
FIG. 4 is a block diagram illustrating an apparatus for generating a digital value according to another exemplary embodiment.

FIG. 4 is a block diagram illustrating an apparatus 400 for generating a digital value according to another exemplary embodiment.

A digital value generator 410 may generate complementary digital values for an OUT terminal and an OUT_BAR terminal, respectively, and the digital values may be stored in a digital value storage unit 420 corresponding to a non-volatile memory.

The digital value storage unit 420 may be configured using the aforementioned OTP device, or may be configured using a multi-time programmable or many-time programmable (MTP) device.

The MTP device may include all non-volatile memories with a rewritable characteristic. The MTP device typically includes any type of non-volatile memory, for example, an Electrically Erasable and Programmable Read-Only Memory (EEPROM), a flash memory, a Silicon-Oxide-Nitride-Oxide-Silicon (SONOS) memory, a Ferroelectrics Random Access Memory (FRAM), a Resistive Random Access Memory (RRAM), and the like.

Accordingly, when the digital value storage unit 420 is configured using the MTP device, embodiments of a wide variety of configuration schemes may be possible.

In the embodiments of FIGS. 1 through 3, when a digital value is generated by the digital value generator 110, the corresponding digital value may be programmed into the fuse unit 210 or the OTP devices 310 and 320, and the programmed digital value may be irreversible and may not return to the pre-programmed value, whether physically and electrically. Accordingly, it has been expressed that the digital value is frozen.

However, although irreversibility may not be guaranteed in an embodiment described with reference to FIG. 4, the digital value generated by the digital value generator 410 may be stored in the digital value storage unit 420 corresponding to a non-volatile memory device when needs to reduce manufacturing and/or configuring expenses or other various needs arise.

Since there may be a probability that the digital value storage unit 420 of the embodiment of FIG. 4 may be re-programmed, a considerably high level of time invariance may be guaranteed when rewriting of the digital value storage unit 420 is prevented.

Although it has been described that the digital value storage unit 420 is configured using a non-volatile memory device, modifications to any type of memory devices that may guarantee time invariance by storing the digital value generated by the digital value generator 410 may be included.

Hereinafter, various embodiments for configurations of the digital value generator 110 or 410 will be described in detail with reference to FIGS. 5 through 9.

Figure 5:
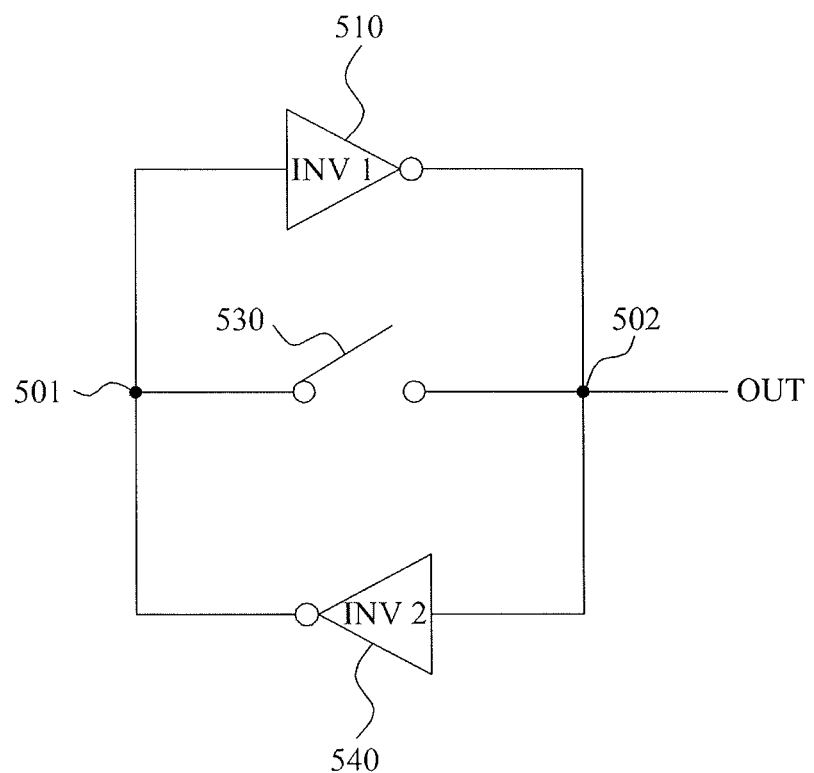
FIG. 5 is a diagram describing a configuration of a digital value generator according to an exemplary embodiment.

FIG. 5 is a diagram to describe a configuration of the digital value generator 110 or 410 according to an exemplary embodiment.

The digital value generator 110 or 410 may be configured using a circuit 500 of FIG. 5.

A first inverter 510 may have a first logic threshold value. A second inverter 540 may have a second logic threshold value. A logic threshold value may refer to a voltage when an input voltage of an inverter is identical to an output voltage of the inverter. The logic threshold value may be measured using a voltage when an output terminal of an inverter currently being operated and an input terminal of the inverter are shorted.

Inverters manufactured by an equivalent process may be designed to have identical logic threshold values. However, since semiconductor process variation may exist in an actual manufacturing process as described above, it may be possible that two manufactured inverters do not have perfectly identical logic threshold values.

According to an exemplary embodiment, the first inverter 510 and the second inverter 540 may be manufactured by an equivalent manufacturing process, and a difference may exist between logic threshold values resulting from semiconductor process variation.

The difference between the logic threshold values may depend on processes, and may correspond to, for example, a size of about a few millivolts to tens of millivolts. Accordingly, the logic threshold value of the first inverter 510 and the logic threshold value of the second inverter 540 may not be compared accurately using a separate comparator circuit, due to an error in measurement.

Accordingly, a method of comparing the logic threshold values of the first inverter 510 and the second inverter 540, without using a separate comparator circuit, will be described based on the circuit 500 of FIG. 5.

Through use of the circuit 500, which of the first inverter 510 and the second inverter 540 has a greater logic threshold value may be determined, by comparing the relative logic threshold values of the first inverter 510 and the second inverter 540.

When the second inverter 540 is absent, an output voltage of the first inverter 510 is the same as the logic threshold value of the first inverter 510 when an input terminal and an output terminal of the first inverter 510 are shorted.

Also, when the first inverter 510 is absent, an output voltage of the second inverter 540 is the same as the logic threshold value of the second inverter 540 when an input terminal and an output terminal of the second inverter 540 are shorted.

However, as shown in FIG. 5, when the input terminal of the first inverter 510 and the output terminal of the second inverter are shorted so as to be connected to a first node 501, and the output terminal of the first inverter 510 and the input terminal of the second inverter 540 are shorted so as to be connected to a second node 502, different results may be yielded.

When the first node 501 and the second node 502 are shorted by closing a switch 530, voltage values of the first node 501 and the second node 502 which are shorted may correspond to a value between the logic threshold value of the first inverter 510 and the logic threshold value of the second inverter 540. Hereinafter, the value may not correspond to an average value of the logic threshold values of the first inverter 510 and the logic threshold value of the second inverter 540.

Irrespective of which one of the first inverter 510 and the second inverter 540 has a greater threshold value, a voltage of the first node 501 and a voltage of the second node 502 may correspond to the value between the logic threshold value of the first inverter 510 and the logic threshold value of the second inverter 540 while the switch 530 is closed.

When the first node 501 and the second node 502 are opened by opening the switch 530, a logical level of a voltage of one of the first node 501 and the second node 502 may correspond to '0,' and a logical level of a voltage of the other of the first node 501 and the second node 502 may correspond to '1.'

For example, in a case of the logic threshold value of the first inverter 510 being lower than the logic threshold value of the second inverter 540, the voltage of the first node 501 may be greater than the logic threshold value of the first inverter 510 while the first node 501 and the second node 502 are shorted by closing the switch 530.

Accordingly, when the first node 501 and the second node 502 are opened by re-opening the switch 530, the first inverter 510 may recognize the voltage of the first node 501 corresponding to the input terminal of the first inverter 510 as a logical level HIGH, and may control a voltage of the second node 502 corresponding to the output terminal of the first inverter 510 to be a logical level LOW.

In this instance, the second inverter 540 may recognize the voltage of the second node 502 corresponding to the input terminal of the second inverter 540 as a logical level LOW, and may control the voltage of the first node 501 corresponding to the output terminal of the second inverter 540 to be a logical level HIGH.

Consequently, the logical level of the voltage of the second node 502 corresponding to an output OUT of the circuit 500 may be HIGH.

Conversely, when the logic threshold value of the first inverter 510 is assumed to be higher that the logic threshold value of the second inverter 540, the voltage of the first node 501 may be lower than the logic threshold value of the first inverter 510 while the first node 501 and the second node 502 are shorted by closing the switch 530.

Accordingly, when the first node 501 and the second node 502 are opened by opening the switch 530 again, the first inverter 510 may recognize the voltage of the first node 501 corresponding to the input terminal of the first inverter 510 as a logical level LOW, and may control the voltage of the second node 502 corresponding to the output terminal of the first inverter 510 to be a logical level HIGH.

In this instance, the second inverter 540 may recognize the voltage of the second node 502 corresponding to the input terminal of the second inverter 540 as a logical level HIGH, and may control the voltage of the first node 501 corresponding to the output terminal of the second inverter 540 to be a logical level LOW.

Consequently, the logical level of the voltage of the second node 502 corresponding to the output OUT of the circuit 500 may be LOW.

As aforementioned, the logical level of the output OUT after the switch 530 is shorted and opened may correspond to HIGH, that is, a digital value of '1,' or LOW, that is, a digital value of '0,' based on which of the first inverter 510 and the second inverter 540 has a greater logic threshold value.

Here, an inverter having a greater logic threshold value between the first inverter 510 and the second inverter 540 that are manufactured by an equivalent manufacturing process may be randomly determined. Also, once manufactured, the inverter having the greater logic threshold value between the first inverter 510 and the second inverter 540 may not be changed easily. However, when a difference between logical threshold values is minute, or an environmental change, for example, noise, external temperature, and the like, is increased, the inverter having the greater logic threshold value between the first inverter 510 and the second inverter 540 may be changed. Although such a situation may not occur frequently, guaranteeing time invariance may be required for implementation of an authentication key of security, authentication, and the like.

Accordingly, when a digital value is generated by the circuit 500, the generated digital value may be frozen by the digital value freezing unit 120 of FIG. 1 or may be stored in the digital value storage unit 420 of FIG. 4, so as to guarantee time invariance.

As is frequently suggested, the circuit 500 may be construed as a unit cell that may generate a 1-bit digital value. When N unit cells are provided, an N-bit digital value may be provided. Hereinafter, unless otherwise mentioned, such scalability may be understood to be implied in a configuration of the digital value generator 110 or 410.

The difference between the logical threshold values of the first inverter 510 and the second inverter 540 will be described in detail by referring to the graph of FIG. 6.

Figure 6:
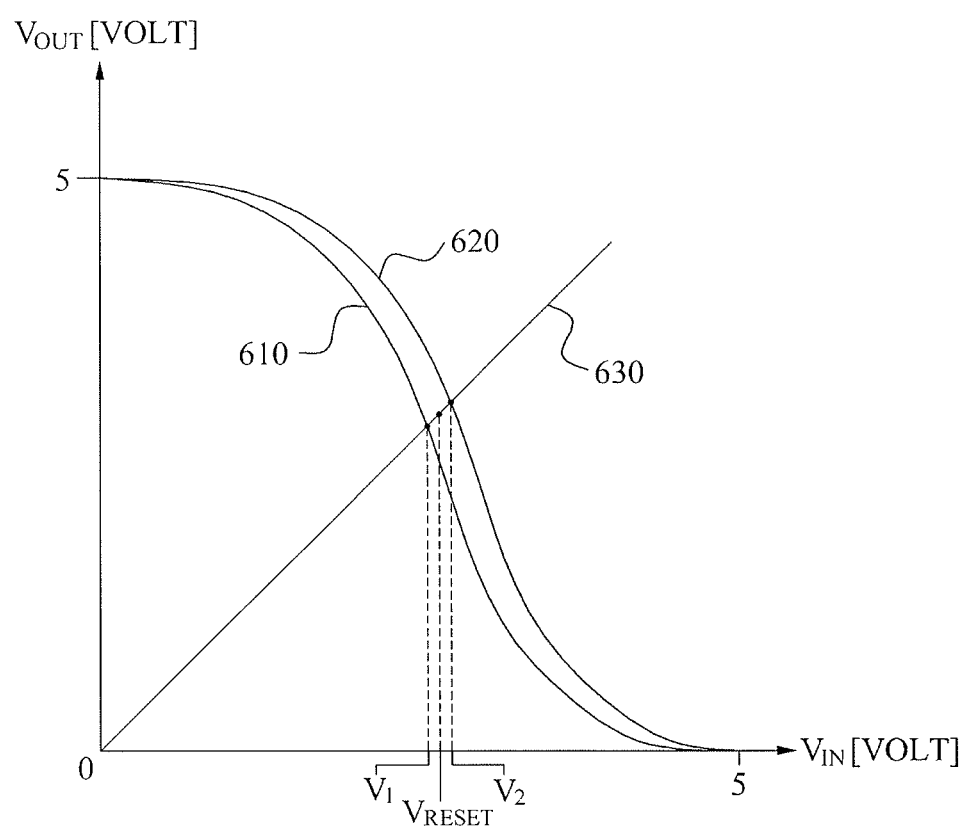
FIG. 6 is a graph explaining an operation of the digital value generator of FIG. 5.

FIG. 6 illustrates voltage characteristic curves in a case in which the logic threshold value of the first inverter 510 is lower than the logic threshold value of the second inverter 540, among the disclosed exemplary embodiments of FIG. 5.

A curve 610 indicates a voltage characteristic curve of the first inverter 510, and a curve 620 indicates a voltage characteristic curve of the second inverter 540. In certain embodiments, when the first inverter 510 and the second inverter 540 are manufactured by an equivalent manufacturing process, the curve 610 and the curve 620 may be almost identical to each other. However, a minute difference may exist between the curve 610 and the curve 620 due to process variation, as shown in FIG. 6.

When an intersection point of the curve 610 and a straight line 630 with a slope of 1 is found, a logic threshold value $V_1$ of the first inverter 510 may be determined. Also, when an intersection point of the curve 620 and the straight line 630 is found, a logic threshold value $V_2$ of the second inverter 540 may be determined.

In this example, $V_1$ is lower than $V_2$. Accordingly, when the first node 501 and the second node 502 are shorted, also referred to as "Reset," by closing the switch 530 of FIG. 5, a voltage $V_{Reset}$ of the first node 501 and a voltage $V_{Reset}$ of the second node 502 may correspond to a value between $V_1$ and $V_2$.

When the first node 501 and the second node 502 are opened by opening the switch 530 again, the first inverter 510 may recognize the voltage of the first node 501 ($V_{Reset}$) as a logical level HIGH, and may control the voltage of the second node 502 corresponding to an output terminal of the first inverter 510 to be a logical level LOW.

In this instance, the second inverter 540 may recognize the voltage ($V_{Reset}$) of the second node 502 as a logical level LOW, and may control the voltage of the first node 501 corresponding to the output terminal of the second inverter 540 to be a logical level HIGH.

Accordingly, the logical level of the voltage $V_{Reset}$ of the second node 502 corresponding to the output OUT of the circuit 500 of FIG. 5 may be HIGH.

Among various embodiments to describe a random digital value generated based on a difference in characteristics between devices using semiconductor process variation, one embodiment using an inverter has been described with reference to FIGS. 4 and 5.

However, a configuration of the inverter is not limited to the circuit 500 of FIG. 5, and the present disclosure includes various embodiments that may generate a random digital value using a difference in characteristics between devices using semiconductor process variation, without departing from the principles and spirit of the invention.

The digital value generator 110 or 410 may be configured using various electronic circuits, for example, a differential amplifier, a latch circuit, and the like, in addition to an inverter. Hereinafter, examples of such embodiments will be described with reference to FIGS. 7 through 9.

Figure 7:
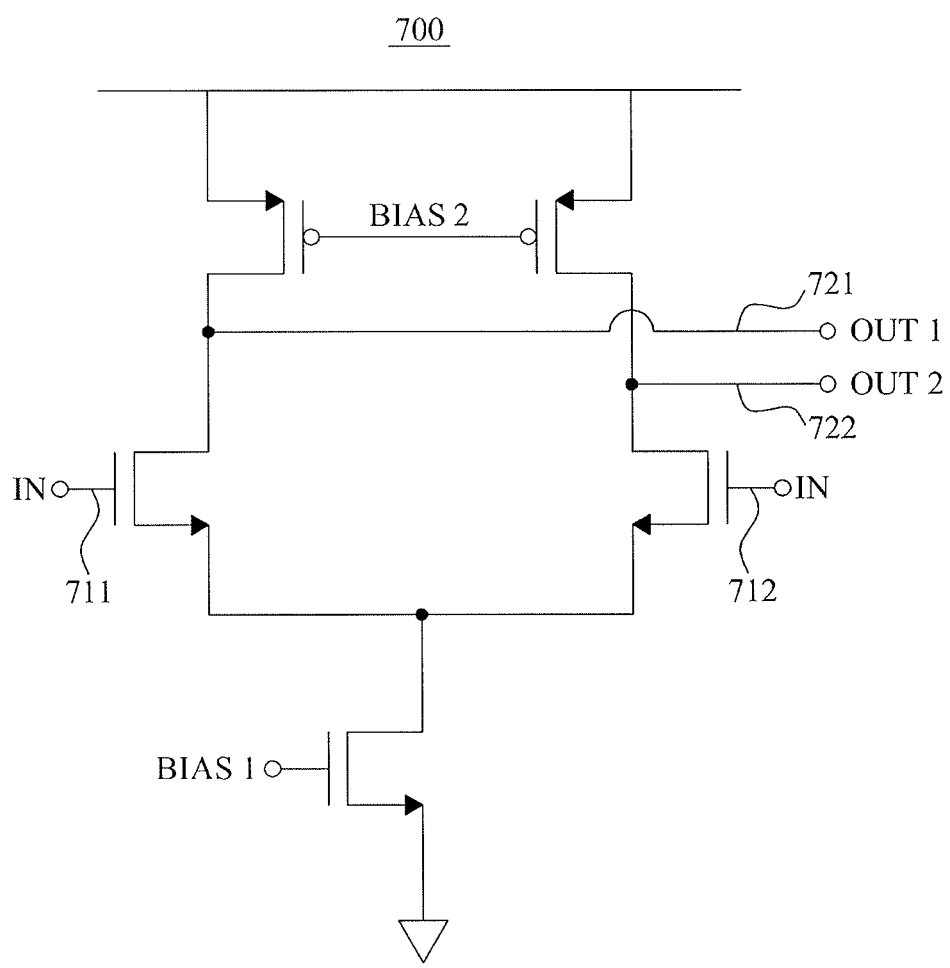
FIG. 7 is a diagram illustrating a configuration of a digital value generator according to another exemplary embodiment.

FIG. 7 is a diagram describing a configuration of the digital value generator 110 or 410 according to another exemplary embodiment.

Referring to FIG. 7, a differential amplifier circuit 700 is used to configure the digital value generator 110 or 410.

When a first input terminal 711 and a second input terminal 712 of a differential amplifier are shorted, different digital values, for example, a value of '1' and a value of '0,' may be output from a first output node 721 and a second output node 722 due to semiconductor process variation.

The differential amplifier circuit 700 may initially amplify a difference between a voltage of the first input terminal 711 and a voltage of the second input terminal 712, and may provide the amplified difference as a difference between a voltage value of the first output node 721 and a voltage of the second output node 722.

Accordingly, when the first input node 711 and the second input node 712 are shorted, the difference between the voltage of the first output node 721 and the voltage of the second output node 722, may theoretically be zero.

However, due to a difference in electrical characteristics of devices included in the differential amplifier circuit 700, for example, transistors, generated by semiconductor process variation, the difference between the voltage of the first output node 721 and the voltage of the second output node 722 may not correspond to zero when the first input node 711 and the second input node 712 are shorted.

Also, in addition to the difference in the electrical characteristics of the devices, that is, the transistors, a difference in electrical characteristics of passive devices (not shown), for example, a resistor, a capacitor, an inductor, and the like, that may be included in the differential amplifier circuit 700 may also cause a difference in voltage.

That is, the process variation in a chip manufacturing process may bring about a difference in shapes and structures of the passive devices and, thus, the passive devices may have different characteristic values.

Accordingly, by comparing which of the first output node 721 and the second output node 722 has a greater voltage when the first input node 711 and the second input node 712 are shorted, a 1-bit identification key may be generated.

For example, in a case in which the voltage of the first output node 721 is higher than the voltage of the second output node 722 when the first input node 711 and the second input node 712 are shorted, a digital value generated may be determined to be '1.' Otherwise, a digital value generated may be determined to be '0.'

Also, when N unit cells are provided as aforementioned, an N-bit digital value may be generated.

Figure 8A:
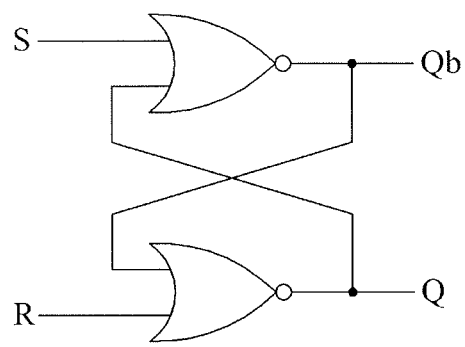
FIGS. 8A and 8B are diagrams illustrating a configuration of a digital value generator according to another exemplary embodiment.
Figure 8B:
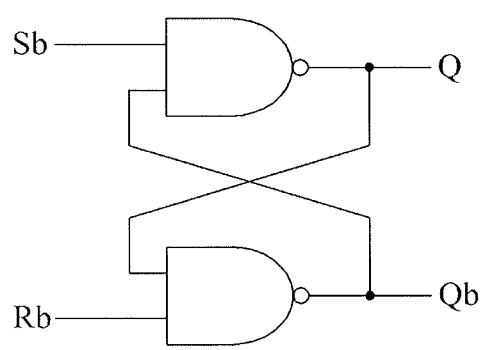

FIGS. 8A and 8B are diagrams describing a configuration of the digital value generator 110 or 410 according to another exemplary embodiment.

Referring to FIGS. 8A and 8B, a set-reset (SR) latch is used to configure the digital value generator 110 or 410. FIGS. 8A and 8B illustrate two (of many) examples of configuring the SR latch.

In FIG. 8A, NOR gates are used. In FIG. 8B, NAND gates are used.

In order to have the same logical inputs and outputs in the NOR and NAND gate configurations, two inputs Sb and Rb in the NAND gates of FIG. 8B may correspond to inverse signals of two inputs S and R in the NOR gates of FIG. 8A.

In order to configure the digital value generator 110 or 410 using the circuit illustrated in FIG. 8A or 8B, a value of '1' may first be input to both the two inputs S and R.

According to a theoretical logic table of an SR latch, when a logical level of '0' is input to both the inputs S and R, an output Q and an output Qb corresponding to a reverse level of the output Q may be undefined. When a logical level of '1' is input to both the inputs S and R, each of the output Q and the output Qb may correspond to a logical level of '0.' Here, when the logical level input to both of the inputs S and R is changed to a logical level of '0,' the output Q and the output Qb may be determined to be complementary to each other due to a difference between characteristic values of devices constituting the two NOR gates. That is, the output Q may correspond to '1' and the output Qb may correspond to '0,' or conversely, the output node Q may correspond to '0' and the output node Qb may correspond to '1.'

An actual result of these two cases may be randomly obtained. This is because although devices included in the NOR gates of the circuit of FIG. 8A and the NAND gates of the circuit of FIG. 8B may have different characteristics from one another, for example, threshold voltage, mobility, and the like, the result may be unpredictable.

Accordingly, the digital value generator 110 or 410 configured by the circuit of FIG. 8A or 8B may generate a random digital value.

Figure 9:
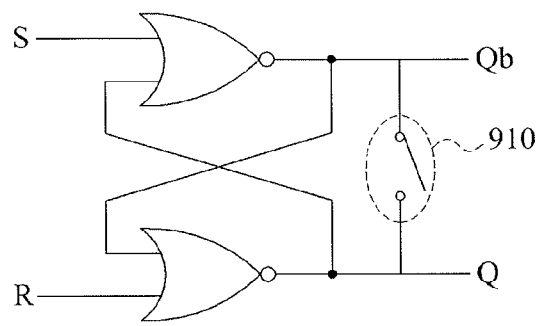
FIG. 9 is a diagram illustrating a configuration of a digital value generator according to another exemplary embodiment.

FIG. 9 is a diagram describing a configuration of a digital value generator according to another exemplary embodiment.

Although a circuit of FIG. 9 is similar to the circuit of FIG. 8A or 8B in using a SR latch, a switch 910 is added between outputs Q and Qb.

A logical level of '0' may be input to both inputs S and R, and the switch 910 may be closed. A voltage of the output Q and a voltage of the output Qb may become identical to each other, and the voltage of the output Q and the voltage of the output Qb may correspond to a value between a voltage corresponding to a logical level of '1' and a voltage corresponding to a logical level of '0.'

When the switch 910 is opened again, the output Q may correspond to '1' and the output Qb may correspond to '0,' or conversely, the output Q may correspond to '0' and the output Qb may correspond to '1,' depending on a logic threshold value of each NOR gate. In this instance, an actual result of these two cases may be randomly obtained.

As described above in connection with FIG. 8, such randomness may materialize since a result, which may be unpredictable, may be determined by devices included in the NOR gates that have characteristics different from one another, for example, a threshold voltage, a mobility, and the like.

Accordingly, the digital value generator 110 or 410 configured by the circuit of FIG. 9 may generate a random digital value.

Hereinafter, examples of circuits of the apparatus 100 for generating a digital value in which the digital value freezing unit 120 is combined with the digital value generator 110 may be described with reference to FIGS. 10 through 17D.

Figure 10:
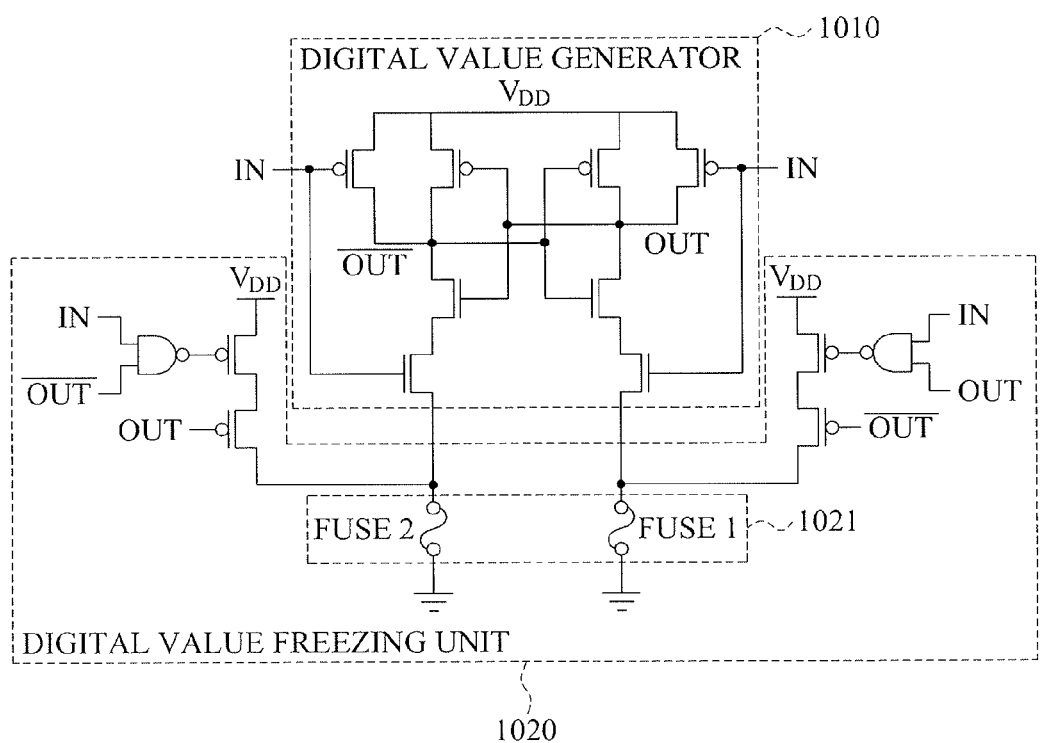
FIG. 10 is a diagram illustrating a configuration of an apparatus for generating a digital value in which a digital value freezing unit according to the embodiment of FIG. 2 is combined with a digital value generator according to the exemplary embodiment of FIG. 8A or 8B.

FIG. 10 is a diagram illustrating a configuration of an apparatus for generating a digital value in which a digital value freezing unit 120 according to the embodiment of FIG. 2 is combined with a digital value generator using an SR latch according to the embodiment of FIG. 8A or 8B.

A configuration of a digital value generator 1010 may be understood by the circuit of the SR latch which has been described with reference to FIGS. 8A and 8B.

When different digital values, for example, a value of '1' and a value of '0,' are generated to two output terminals, OUT and OUT_BAR, by the digital value generator 1010, an overcurrent may be applied to one of fuses 1021 in a digital value freezing unit 1020 based on corresponding results, and one of the fuses 1021 may be blown.

Accordingly, when a fuse is blown, a digital value generated by the digital value generator 1010 may be frozen by the digital value freezing unit 1020.

Figure 11:
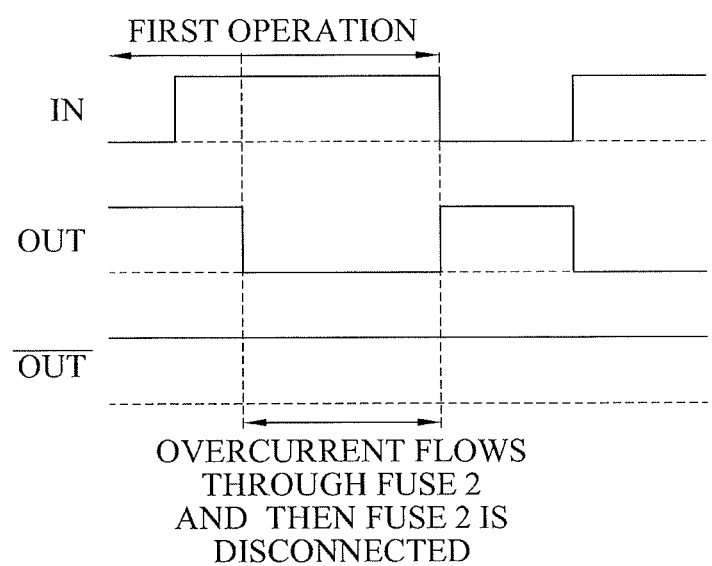
FIG. 11 is a graph illustrating a process of freezing a digital value by a digital value freezing unit according to the exemplary embodiment of FIG. 10.

A process of blowing a fuse will be further described by referring to a graph of FIG. 11.

FIG. 11 is a graph (signal timing chart) describing a process of freezing a digital value by the digital value freezing unit 1020 according to the embodiment of FIG. 10.

For example, during a first operation of the digital value generator 1010 of FIG. 10, an overcurrent may be applied to a fuse 2 based on the difference in outputs OUT and OUT_BAR, and the fuse 2 may be blown, and thus, freeze a digital value.

An arrangement of the fuses 1021 of FIG. 10 may be just one of several exemplary embodiments. Accordingly, other various arrangements of fuses will be further described with reference to FIGS. 12A through 12D, in addition to the embodiment of FIG. 10.

FIGS. 12A through 12D are diagrams in which a digital value freezing unit is disposed in an apparatus for generating a digital value according to various exemplary embodiments.

FIG. 12A illustrates a configuration of a digital value generator configured using an SR latch, and FIGS. 12B through 12D illustrate various positions 1210, 1220, and 1230 of fuses that may be disposed along with SR latches.

Detailed operations can be sufficiently understood through descriptions provided with reference to FIGS. 8A through 11 and, thus, detailed descriptions may be omitted.

As described with reference to FIG. 3, a digital value may be frozen by OTP devices, in lieu of the fuses, and such an embodiment will be described with reference to FIGS. 13A through 13D.

FIGS. 13A through 13D are diagrams illustrating various configurations of a digital value freezing unit when the digital value freezing unit is configured using an OTP device according to exemplary embodiments.

Similar to FIGS. 12A through 12D, FIG. 13A illustrates a configuration of a digital value generator configured using an SR latch, and FIGS. 13B through 13D illustrate various positions 1310, 1320, and 1330 of OTP devices that may be disposed along with SR latches.

A process of freezing a digital value using the OTP devices can be sufficiently understood through FIG. 3 and the like and, thus, detailed descriptions may be omitted.

Examples of various arrangements of a circuit in which a digital value freezing unit may be combined with a digital value generator according to the embodiments using inverters as described with reference to FIGS. 5 and 6 as well as an SR latch will be provided hereinafter.

FIGS. 14A through 14E are diagrams in which a digital value freezing unit is disposed in an apparatus for generating a digital value when a digital value generator is configured according to the embodiment of FIG. 5, according to exemplary embodiments.

FIG. 14A illustrates a configuration of the digital value generator configured using inverters described with reference to FIG. 5, and FIGS. 14B through 14E illustrate various positions 1410, 1420, 1430, and 1440 of fuses that may be disposed along with the inverters.

In this instance, a digital value may be frozen by OTP devices, in lieu of the fuses, and such an embodiment will be described with reference to FIGS. 15A through 15E.

FIGS. 15A through 15E are diagrams illustrating various configurations of a digital value freezing unit when a digital value generator is configured according to the embodiment of FIG. 5 and the digital value freezing unit is configured using an OTP device, according to exemplary embodiments.

Similar to FIGS. 14A through 14E, FIG. 15A illustrates a configuration of a digital value generator configured using inverters, and FIGS. 15B through 15E illustrate various positions 1510, 1520, 1530, and 1540 of OTP devices that may be disposed along with the inverters.

FIGS. 16A through 16D are diagrams in which a digital value freezing unit is disposed in an apparatus for generating a digital value when a digital value generator is configured according to the embodiment of FIG. 7, according to exemplary embodiments.

Figure 16A:
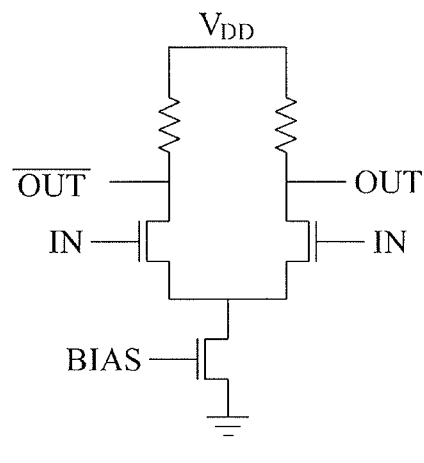
FIGS. 16A through 16D are diagrams in which a digital value freezing unit is disposed in an apparatus for generating a digital value when a digital value generator is configured according to the embodiment of FIG. 7, according to another exemplary embodiment.
Figure 16B:
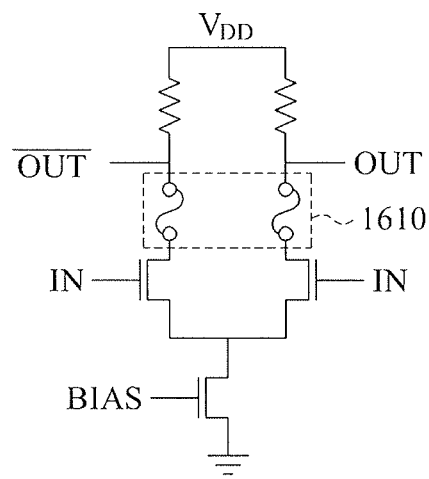
Figure 16C:
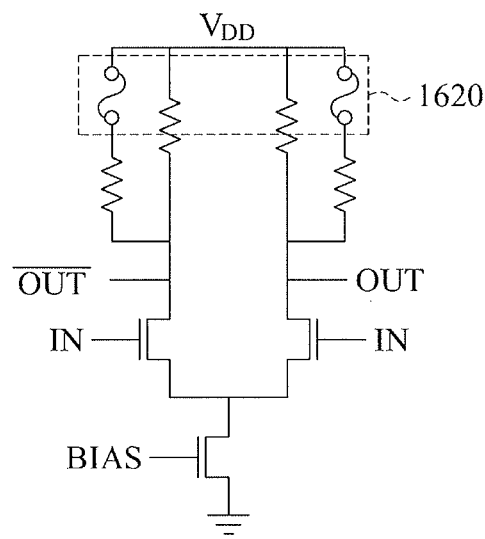
Figure 16D:
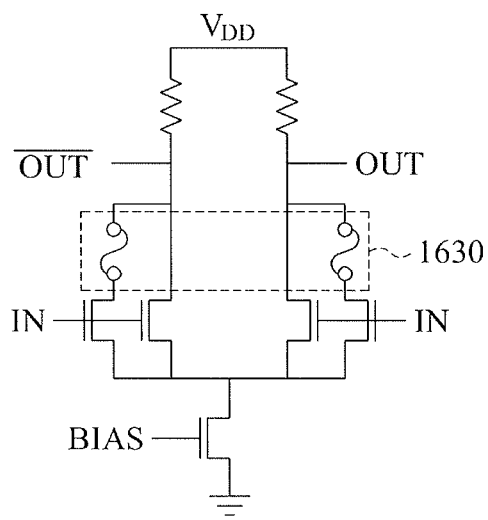

FIG. 16A illustrates a configuration of a digital value generator configured using the differential amplifier described with reference to FIG. 7, and FIGS. 16B through 16D illustrate various positions 1610, 1620, and 1630 of fuses that may be disposed in the apparatus for generating a digital value, along with the differential amplifier.

In this instance, a digital value may be frozen by OTP devices, in lieu of the fuses, and such an embodiment will be described with reference to FIGS. 17A through 17D.

FIGS. 17A through 17D are diagrams illustrating various configurations of a digital value freezing unit when a digital value generator is configured according to the embodiment of FIG. 7 and the digital value freezing unit is configured using an OTP device, according to another embodiment.

Figure 17A:
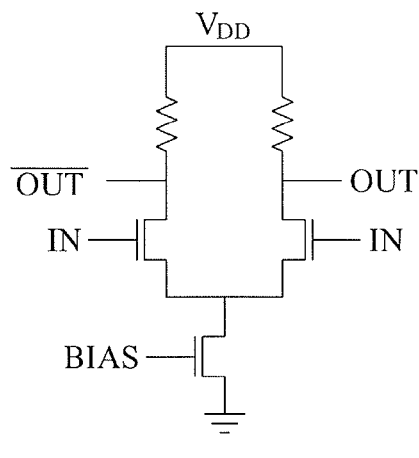
FIGS. 17A through 17D are diagrams illustrating various configurations of a digital value freezing unit when a digital value generator is configured according to the embodiment of FIG. 7 and the digital value freezing unit is configured using an OTP device, according to another exemplary embodiment.
Figure 17B:
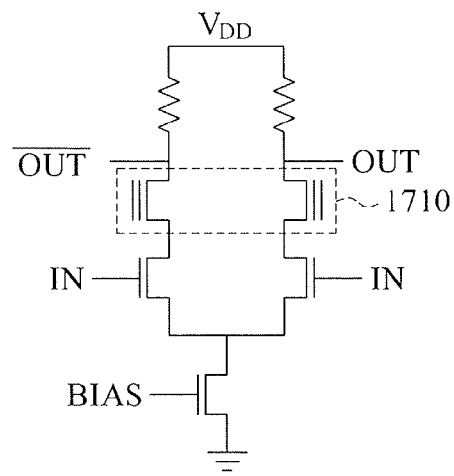
Figure 17C:
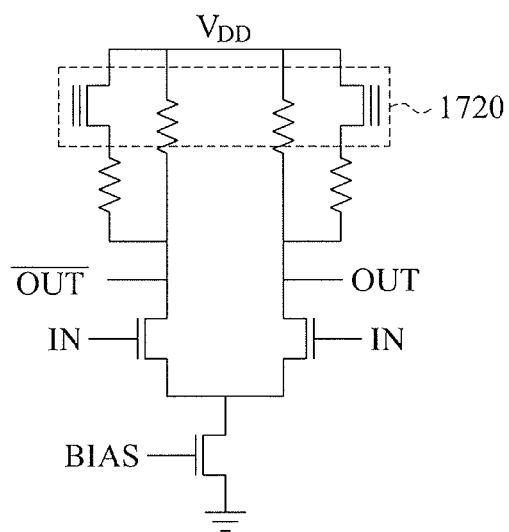
Figure 17D:
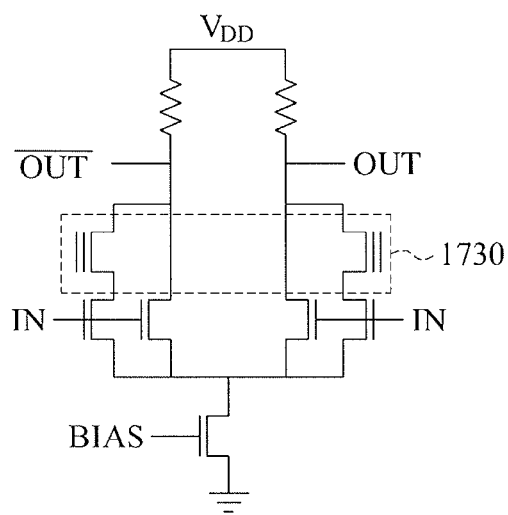

Similar to FIGS. 16A through 16D, FIG. 17A illustrates a configuration of a digital value generator configured using a differential amplifier, and FIGS. 17B through 17D illustrate various positions 1710, 1720, and 1730 of OTP devices that may be disposed along with the differential amplifier.

Figure 18:
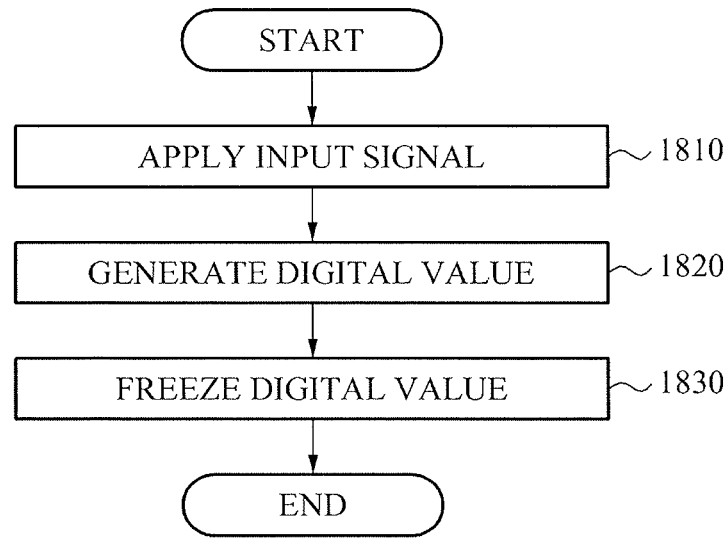
FIG. 18 is a flowchart illustrating a method of generating a digital value according to an exemplary embodiment.

FIG. 18 is a flowchart illustrating a method of generating a digital value according to an exemplary embodiment.

In operation 1810, an input signal may be applied to the digital value generator 110 of the apparatus 100 of FIG. 1 for generating a digital value. The application of the input signal may include a voltage application, a current operation, a first operation, and the like.

In operation 1820, the digital value generator 110 may generate a digital value using a difference between characteristic values of semiconductor devices, resulting from semiconductor process variation. A process of the operation 1820 by which the digital value generator 110 may generate a random digital value has been described above with reference to FIGS. 1 through 3, and 5 through 9.

In operation 1830, the digital value freezing unit 120 may freeze the random digital value generated in operation 1820 so as to guarantee time invariance.

The process of freezing the digital value has been described above with reference to FIGS. 2 and 3, and 10 through 17.

Figure 19:
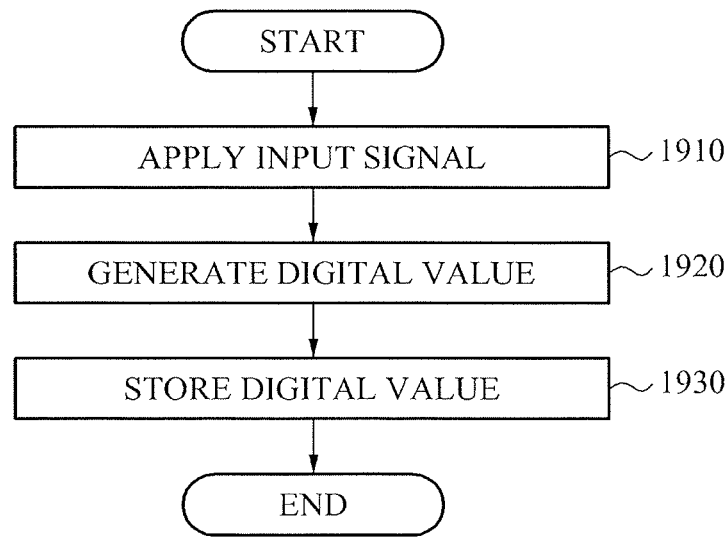
FIG. 19 is a flowchart illustrating a method of generating a digital value according to another exemplary embodiment.

FIG. 19 is a flowchart illustrating a method of generating a digital value according to another exemplary embodiment.

A process of applying an input signal in operation 1910, and a process of generating a random digital value by the digital value generator 410 in operation 1920 are similar to operations 1810 and 1820 of FIG. 18.

However, the method of FIG. 19 differs from the method of FIG. 18 in that the generated random digital value may be stored in the digital value storage unit 420 of FIG. 4. The digital value storage unit 420 has been described above with reference to FIG. 4.

According to various exemplary embodiments, a random digital value may be generated using semiconductor process variation, and the digital value may be frozen or stored so that the digital value may not be changed by aging of a device over time, a change in a peripheral environment, for example, temperature, or noise, such that time invariance may be guaranteed.

Accordingly, a reliable random digital value that may be used as an identification key and the like in various application fields, including security and authentication, may be provided.

The above-described exemplary embodiments of the present disclosure may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present disclosure, or vice versa.

Although a few exemplary embodiments have been shown and described, the present disclosure is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for generating a digital value, the apparatus comprising:
 a generator for generating a digital value based on semiconductor process variation; and
 a freezing unit comprising a control unit connected to the generator for freezing the digital value, wherein the digital value is kept within the apparatus before freezing.

2. The apparatus of claim 1, wherein the freezing unit further comprises a fuse.

3. The apparatus of claim 2, wherein the control unit blows the fuse to freeze the digital value.

4. The apparatus of claim 3, wherein the control unit blows the fuse using an overcurrent.

5. The apparatus of claim 3, wherein the control unit blows the fuse using an overvoltage.

6. The apparatus of claim 3, wherein whether the fuse is blown or un-blown is invariant over time.

7. The apparatus of claim 3, wherein a first state corresponds to the fuse being blown, and a second state corresponds to the fuse being un-blown.

8. The apparatus of claim 3, wherein the first state corresponds to a digital value of 1, and the second state corresponds to a digital value of 0.

9. The apparatus of claim 7, wherein the first state corresponds to a digital value of 0, and the second state corresponds to a digital value of 1.

10. The apparatus of claim 1, wherein the freezing unit further comprises a One-Time Programmable (OTP) device.

11. The apparatus of claim 10, wherein the control unit programs the OTP device to freeze the digital value.

12. The apparatus of claim 11, wherein the digital value programmed in the OTP device is invariant over time.

13. The apparatus of claim 11, wherein the control unit programs the OTP device to freeze the digital value using a control signal of the control unit.

14. The apparatus of claim 1, further comprising:
a storage unit connected to the generator for storing the digital value.

15. The apparatus of claim 14, wherein the storage unit comprises a One-Time Programmable (OTP) device.

16. The apparatus of claim 14, wherein the storage unit comprises a multi-time programmable or many-time programmable (MTP) device.

17. The apparatus of claim 16, wherein the MTP device is programmed to store the digital value.

18. The apparatus of claim 17, wherein the MTP device is prevented from being re-programmed after it is programmed to store the digital value.

19. The apparatus of claim 14, wherein the storage unit comprises a non-volatile memory.

20. The apparatus of claim 19, wherein the digital value is written into the non-volatile memory.

21. The apparatus of claim 20, wherein the non-volatile memory is prevented from being rewritten after the digital value is written into the non-volatile memory.

22. The apparatus of claim 14, wherein the storage unit comprises at least one of an Electrically Erasable and Programmable Read-Only Memory (EEPROM), a flash memory, a Silicon-Oxide-Nitride-Oxide-Silicon (SONOS) memory, a Ferroelectrics Random Access Memory (FRAM), and a Resistive Random Access Memory (RRAM).

23. The apparatus of claim 1, wherein the generator comprises a Physically Unclonable Function (PUF).

24. The apparatus of claim 1, wherein the generator comprises:
a first inverter and a second inverter,
the first inverter and the second inverter manufactured based on an equivalent process and having different electrical characteristic values.

25. The apparatus of claim 24, wherein the different electrical characteristic values are based on the semiconductor process variation.

26. The apparatus of claim 24, wherein the generator further comprises an input terminal and an output terminal of the first inverter, and an input terminal and an output terminal of the second inverter.

27. The apparatus of claim 26, wherein the generator further comprises a first node and a second node, and
wherein the output terminal of the first inverter and the input terminal of the second inverter are connected to the first node, and the input terminal of the first inverter and the output terminal of the second inverter are connected to the second node.

28. The apparatus of claim 27, wherein when the first node and the second node are shorted and then opened, the generator generates the digital value based on a logical level of at least one of the first node and the second node.

29. The apparatus of claim 1, wherein the generator comprises a differential amplifier.

30. The apparatus of claim 29, wherein the generator generates the digital value based on a comparison of voltage values of two output nodes of the differential amplifier when two input nodes of the differential amplifier are shorted.

31. A semiconductor chip comprising the apparatus of claim 1.

32. The apparatus of claim 1,
wherein the generator comprises a Set-Reset (SR) latch.

33. The apparatus of claim 32, wherein the generator generates the digital value based on a logical level of at least one of two output nodes of the Set-Reset (SR) latch.

34. The apparatus of claim 33, wherein the logical level is determined based on a difference in logic threshold values of logic gates used to configure the SR latch when a logical level of '1' is input to two input nodes of the SR latch, and then a logical level of '0' is input to the two input nodes of the SR latch.

35. The apparatus of claim 33, wherein the logical level is determined based on a difference in logic threshold values of logic gates used to configure the SR latch when a logical level of '0' is input to two input nodes of the SR latch, and then a logical level of '1' is input to the two input nodes of the SR latch.

36. The apparatus of claim 33, wherein the logical level is determined based on a difference in logic threshold values of logic gates used to configure the SR latch when two output nodes of the SR latch are shorted, and then opened while a logical level of '0' is input to two input nodes of the SR latch.

37. The apparatus of claim 33, wherein the logical level is determined based on a difference in logic threshold values of logic gates used to configure the SR latch when two output nodes of the SR latch are shorted, and then opened while a logical level of '1' is input to two input nodes of the SR latch.

38. An apparatus for generating a digital value, the apparatus comprising:
a generator for generating a digital value based on semiconductor process variation, wherein the generator comprises a Set-Reset (SR) latch and generates the digital value based on a logical level of at least one of two output nodes of a Set-Reset (SR) latch, wherein the logical level is determined based on a difference in logic threshold values of logic gates used to configure the SR latch when two output nodes of the SR latch are shorted, and then opened while a logical level of '1' is input to two input nodes of the SR latch.

39. A method for generating a digital value, comprising:
generating, in an apparatus, a digital value based on semiconductor process variation;
providing the digital value to a freezing unit comprising a control unit for freezing the digital value, wherein the digital value is kept within the apparatus before freezing; and
freezing the digital value.

40. The method of claim 39, wherein freezing the digital value further comprises blowing a fuse to freeze the digital value.

41. The method of claim 40, wherein the control unit blows the fuse using an overcurrent.

42. The method of claim 40, wherein the control unit blows the fuse by an overvoltage.

43. The method of claim 40, wherein whether the fuse is blown or un-blown is invariant over time.

44. The method of claim 40, wherein a first state corresponds to the fuse being blown, and a second state corresponds to the fuse being un-blown.

45. The method of claim 44, wherein the first state corresponds to a digital value of 1, and the second state corresponds to a digital value of 0.

46. The method of claim 44, wherein the first state corresponds to a digital value of 0, and the second state corresponds to a digital value of 1.

47. The method of claim 39, wherein freezing the digital value comprises:
programming a One-Time Programmable (OTP) device to freeze the digital value.

48. The method of claim 47, wherein the digital value programmed in the OTP device is invariant over time.

49. The method of claim 47, wherein the control unit programs the OTP device to freeze the digital value using a control signal.

50. The method of claim 39, further comprising:
providing the digital value to a storage unit for storing the digital value; and
storing the digital value in the storage unit.

51. The method of claim 50, wherein storing the digital value further comprises programming a One-Time Programmable (OTP) device to store the digital value.

52. The method of claim 50, wherein storing the digital value further comprises programming a multi-time programmable or many-time programmable (MTP) device to store the digital value.

53. The method of claim 52, wherein the MTP device is prevented from being re-programmed after it is programmed to store the digital value.

54. The method of claim 50, wherein storing the digital value further comprises writing the digital value into a non-volatile memory.

55. The method of claim 54, wherein the non-volatile memory is prevented from being rewritten after the digital value is written into the non-volatile memory.

56. The method of claim 54, wherein the non-volatile memory comprises at least one of an Electrically Erasable and Programmable Read-Only Memory (EEPROM), a flash memory, a Silicon-Oxide-Nitride-Oxide-Silicon (SONOS) memory, a Ferroelectrics Random Access Memory (FRAM), and a Resistive Random Access Memory (RRAM).

57. The method of claim 39, wherein generating the digital value further comprises:
shorting a first node of an electric circuit and a second node of the electric circuit;
opening the first node of the electric circuit and the second node of the electric circuit; and
generating a digital value based on a logical level of at least one of the first node and the second node.

58. The method of claim 57, wherein:
the first node is connected to an output terminal of a first inverter and an input terminal of a second inverter; and
the second node is connected to an input terminal of the first inverter and an output terminal of the second inverter.

59. The method of claim 58, wherein the first inverter and the second inverter are manufactured based on an equivalent process and having different electrical characteristic values.

60. The method of claim 59, wherein the different electrical characteristic values are based on the semiconductor process variation.

61. The method of claim 39, wherein generating the digital value further comprises:
shorting two input nodes of a differential amplifier; and
generating a digital value based on a comparison of voltage values of two output nodes of the differential amplifier.

62. A device programmed with a digital value generated by the method of claim 39.

63. The device of claim 62 comprising at least one of a One-Time Programmable (OTP) device and a multi-time programmable or many-time programmable (MTP) device.

64. The method of claim 39, wherein generating the digital value further comprises
generating a digital value based on a logical level of at least one of two output nodes of a Set-Reset (SR) latch.

65. The method of claim 64, wherein generating a digital value based on a logical level of at least one of two output nodes of a Set-Reset (SR) latch further comprises:
determining the logical level of at least one of two output nodes of the SR latch, based on a difference in logic threshold values of logic gates used to configure the SR latch when:
a logical level of 1 is input to two input nodes of the SR latch; and
a logical level of '0' is input to the two input nodes of the SR latch; and
generating a digital value based on the determined logical level.

66. The method of claim 64, wherein generating a digital value based on a logical level of at least one of two output nodes of a Set-Reset (SR) latch further comprises:
determining the logical level of at least one of two output nodes of the SR latch, based on a difference in logic threshold values of logic gates used to configure the SR latch when:
a logical level of '0' is input to two input nodes of the SR latch; and
a logical level of '1' is input to the two input nodes of the SR latch; and
generating a digital value based on the determined logical level.

67. The method of claim 64, wherein generating a digital value based on a logical level of at least one of two output nodes of a Set-Reset (SR) latch further comprises:
determining the logical level of at least one of two output nodes of the SR latch, based on a difference in logic threshold values of logic gates used to configure the SR latch when:
two output nodes of the SR latch are shorted; and
the two output nodes of the SR latch are opened while a logical level of '0' is input to two input nodes of the SR latch; and
generating a digital value based on the determined logical level.

68. The method of claim 64, wherein generating a digital value based on a logical level of at least one of two output nodes of a Set-Reset (SR) latch further comprises:
determining the logical level of at least one of two output nodes of the SR latch, based on a difference in logic threshold values of logic gates used to configure the SR latch when:
two output nodes of the SR latch are shorted; and
the two output nodes of the SR latch are opened while a logical level of '1' is input to two input nodes of the SR latch; and
generating a digital value based on the determined logical level.

* * * * *